Sept. 19, 1950   J. MÜLLER   2,522,532
DIAPER
Filed Jan. 24, 1946

INVENTOR
JEANETTE MÜLLER
BY
ATTORNEYS

Patented Sept. 19, 1950

2,522,532

UNITED STATES PATENT OFFICE 2,522,532

DIAPER

Jeanette Müller, Zurich, Switzerland, assignor to Pollux-Trust, Vaduz, Principality of Liechtenstein Application January 24, 1946, Serial No. 643,185
In Switzerland February 22, 1945

2 Claims. (Cl. 128—284)

The invention in question relates to a diaper construction which can be destroyed without difficulty after use and which consists of a layer of paper wadding which, upon saturation, will become sufficiently compacted to hold its shape, and a further layer of absorbent material of different absorptive capacities and of different sizes which will have the necessary firmness imparted to it by the compacted overlying layer of wadding and yet can easily be scrapped after use.

Figure 1:
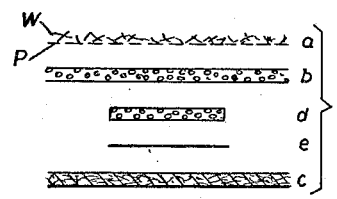
Figure 2:
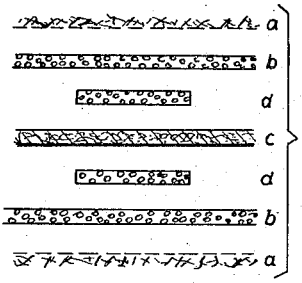

Two satisfactory embodiments of the invention are shown by way of example on the accompanying drawing, wherein:

Fig. 1 shows diagrammatically a section of a diaper constructed in accordance with the invention; and Fig. 2 illustrates a modification.

Referring to the drawing, and particularly to Fig. 1, the diaper structure includes a layer $a$ made of paper wadding and a second layer $b$ of some absorbent, easily destructible material, such as, for example, one or several layers of paper. It is desirable that the diaper be wadded on one side only, as indicated in Fig. 1 where $w$ indicates the layer of wadding and $p$ the layer of paper, to which it is adhesively or otherwise secured. For reasons of hygiene it is desirable that the wadding be arranged on the outside.

A layer $c$ is provided which is also made of absorbent, easily destructible material which serves to retain moisture and is consequently more compact than the second layer $b$. It is therefore of advantage to arrange that the second layer $b$ is placed between $a$ and $c$. The three layers can be held together either by compression, that is to say by adhesion, or by some other means, for instance, by sewing them together.

A fourth layer 4 is further provided with the intention of improving the absorbing capacity at places particularly exposed to moisture. It is best manufactured from the same or similar material to that of layer $b$, and does not need to be of the same size as the other layers. Layer $d$ can be placed on the other side of layer $b$, or two layers $d$ can be fixed one on each side of layer $b$.

The structure includes further a layer $e$ made of less absorbent material, e. g., impregnated paper, superimposed on layer $d$ with the object on the one hand of exploiting to the full the absorbing capacity of the upper layers, and on the other hand of preventing the moisture from penetrating quickly to the outside. This layer can be placed directly under the outer layer $c$ as shown in Fig. 1. As shown in such figure the layer $e$ is best placed where the greatest degree of moisture is to be expected, and thus covers approximately the same area as layer $d$, so that the absorbent layers $b$ and $c$ on opposite sides thereof are in direct contact with each other at the margin of the diaper.

The structures described above apply to all diapers which can only be used on one side, and consequently where care must be taken as to which surface faces inwards and which outwards. This may be a drawback in many cases, particularly when the light is bad, but the difficulty can be surmounted by constructing the napkin symmetrically, an example of which is shown in Fig. 2. The order of the various layers can, of course, be different, provided that the symmetry is maintained. For example, a layer of the $e$ type may be placed between layers $d$ and $c$, or layer $e$ may be substituted for layer $c$. Layer $c$ can also be omitted and the number of layers $d$ can vary.

I claim:

1. A disposable diaper comprising an upper layer formed of an outer layer of wadding on a layer of paper, an absorbent, easily destructible paper layer below said upper layer, a bottom absorbent cellulosic layer, and a relatively non-absorbent layer between the bottom layer and the next upper layer, said relatively non-absorbent layer being of smaller area than the absorbent layers, so that the absorbent layers are in direct contact with each other at the margin of the diaper.

2. A disposable diaper comprising an upper layer composed of a hydrophilic cotton wadding on a cellulosic paper wadding, and a plurality of layers of cellulosic wadding, of which at least one comprises a cellulosic paper wadding; one a water-impermeable layer and at least one cellulosic paper wadding layer, the water-impermeable layer lying between two cellulosic paper wadding layers and being of smaller area than the latter, so that the cellulosic paper wadding layers lie directly upon each other at the margin of the diaper.

JEANETTE MÜLLER.

REFERENCES CITED

The following references are of record in the file of this patent:

UNITED STATES PATENTS

| Number | Name | Date |
|---|---|---|
| 162,647 | Hatch | Apr. 27, 1875 |
| 1,352,774 | Angier | Sept. 14, 1920 |
| 1,599,648 | Cochran | Sept. 14, 1926 |
| 1,674,600 | Mackenzie | June 19, 1928 |
| 1,702,530 | Williams | Feb. 19, 1929 |